(12) United States Patent
Hammer et al.

(10) Patent No.: US 9,403,124 B2
(45) Date of Patent: Aug. 2, 2016

(54) METHOD FOR REDUCING THE CONCENTRATION OF NITROGEN DIOXIDE

(71) Applicant: SIEMENS AKTIENGESELLSCHAFT, München (DE)

(72) Inventors: Thomas Hammer, Hemhofen (DE); Arno Römpke, Neunkirchen a. Br. (DE); Ralf Sigling, Baiersdorf (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/417,322

(22) PCT Filed: Jun. 13, 2013

(86) PCT No.: PCT/EP2013/062244
§ 371 (c)(1),
(2) Date: Jan. 26, 2015

(87) PCT Pub. No.: WO2014/019756
PCT Pub. Date: Feb. 6, 2014

(65) Prior Publication Data
US 2015/0202570 A1    Jul. 23, 2015

(30) Foreign Application Priority Data
Aug. 2, 2012  (DE) .......................... 10 2012 213 728

(51) Int. Cl.
*B01D 53/56* (2006.01)
*B01D 53/94* (2006.01)
(Continued)

(52) U.S. Cl.
CPC ........ *B01D 53/9413* (2013.01); *B01D 53/8625* (2013.01); *B01D 53/9431* (2013.01);
(Continued)

(58) Field of Classification Search
CPC ... B01D 53/56; B01D 53/565; B01D 53/8628
See application file for complete search history.

(56) References Cited

U.S. PATENT DOCUMENTS 4,833,113 A    5/1989  Fukuda
5,505,919 A    4/1996  Demoto
(Continued)

FOREIGN PATENT DOCUMENTS

CN    101733166 A  *  6/2010  ............ F01N 13/009
CN    101985893 A  *  3/2011  ......... B01D 53/9477
(Continued)

OTHER PUBLICATIONS

Chinese Office Action issued on Oct. 10, 2015; Application No. 201380040950.0; 20 pgs.
(Continued)

*Primary Examiner* — Timothy Vanoy
(74) *Attorney, Agent, or Firm* — Schmeiser, Olsen & Watts, LLP

(57) ABSTRACT

A method for reducing the concentration of nitrogen oxide in an exhaust gas from an incomplete combustion of hydrocarbons or hydrocarbon mixtures using a catalyst for reducing nitrogen dioxide by oxidizing non-combusted hydrocarbons or hydrocarbon mixtures, a device for reducing the concentration of nitrogen dioxide in an exhaust gas from an incomplete combustion of hydrocarbons or hydrocarbon mixtures using a catalyst for reducing nitrogen dioxide by oxidizing non-combusted hydrocarbons or hydrocarbon mixtures, and a system including the device is provided.

17 Claims, 4 Drawing Sheets

(51) Int. Cl.
    *B01D 53/86* (2006.01)
    *F01N 3/18* (2006.01)

(52) U.S. Cl.
    CPC ............... *B01D53/9477* (2013.01); *F01N 3/18* (2013.01); *B01D 2255/1021* (2013.01); *B01D 2255/20707* (2013.01); *B01D 2255/20723* (2013.01); *B01D 2255/20738* (2013.01); *B01D 2255/20776* (2013.01); *B01D 2255/40* (2013.01); *B01D 2255/504* (2013.01); *B01D 2257/404* (2013.01); *B01D 2258/0283* (2013.01)

(56) References Cited

U.S. PATENT DOCUMENTS

| | | | |
|---|---|---|---|
| 6,171,372 B1 * | 1/2001 | Ichiki | B01D 53/02 423/239.1 |
| 7,033,969 B1 | 4/2006 | Cauvel | |
| 2003/0226352 A1 * | 12/2003 | Chandler | B01D 53/56 60/301 |
| 2004/0180783 A1 | 9/2004 | Iida | |
| 2008/0317652 A1 | 12/2008 | Bono | |
| 2009/0255236 A1 | 10/2009 | Blakeman | |
| 2010/0215558 A1 | 8/2010 | Kraemer | |
| 2012/0237422 A1 * | 9/2012 | Winkler | B01D 53/504 423/235 |

FOREIGN PATENT DOCUMENTS

| | | | |
|---|---|---|---|
| CN | 102213123 A * | 10/2011 | ......... B01D 53/9477 |
| EP | 1353042 A2 | 10/2003 | |
| WO | WO 2006040533 A1 | 4/2006 | |

OTHER PUBLICATIONS

Schwidder M.; "Beiträge zur Identifizierung der aktiven Zentren in Fe/ZSM-5-DeNOx-Katalysatoren"; Ruhr-Universität Bochum, Lehrstuhl für Technische Chemie; Dissertation; pp. 1-240; 2004; DE.
Traa Y. et al; "Zeolite-based materials for the selective catalytic reduction of NOx with Hydrocarbons"; Microporous and Mesoporous Materials; vol. 30; pp. 3-41; 1999.
Marinov et al., "An Experimental and Kinetic Calculation of the Promotion Effect of Hydrocarbons on the NO–NO2 Conversion in a Flow Reactor", Twenty-Seventh Symposium (International) on Combustion/The Combustion Institute, 1998, pp. 389-396.
International Search Report; PCT/EP2013/062244; International Filing Date: Jun. 13, 2013; 3 pgs.

* cited by examiner

- ■ NO₂ im thermischen Gleichgewicht
- □ NO im thermischen Gleichgewicht
- ◆ NO₂ nach Katalysator
- ◇ NO nach Katalysator — NO₂ (ein)  — NO₂ (aus)
······ NO (ein)  --- NO (aus)

METHOD FOR REDUCING THE CONCENTRATION OF NITROGEN DIOXIDE

CROSS-REFERENCE TO RELATED APPLICATIONS

This application claims priority to PCT Application No. PCT/EP2013/062244, having a filing date of Jun. 13, 2013, based off of DE 102012213728.9 having a filing date of Aug. 2, 2012, the entire contents of which are hereby incorporated by reference.

FIELD OF TECHNOLOGY

The following relates to a method for reducing the concentration (reducing the content) of nitrogen dioxide in an exhaust gas from an incomplete combustion of hydrocarbons or hydrocarbon mixtures using a catalyst for reducing nitrogen dioxide by oxidizing uncombusted hydrocarbons or hydrocarbon mixtures, a device for reducing the concentration of nitrogen dioxide in an exhaust gas from an incomplete combustion of hydrocarbons or hydrocarbon mixtures using a catalyst for reducing nitrogen dioxide by oxidizing uncombusted hydrocarbons or hydrocarbon mixtures, and also a system comprising the device.

BACKGROUND

Currently, owing to the increasing worldwide energy demand, it is increasingly required to generate energy efficiently and cleanly in various systems, and this also applies to conventional systems for generating energy which are operated by combustion of hydrocarbons or hydrocarbon mixtures.

Gas-turbine operated generators in this case are a clean and efficient possibility for generating electrical energy, not only for public energy supply but also for industrial use. Thanks to the use of high-grade ceramic protective layers and sophisticated cooling concepts, gas turbines can now be operated with mean turbine intake temperatures of sometimes above 1500° C., and thus achieve net efficiencies of 40% without heat recovery and exergetic efficiencies of above 60% with heat recovery via coupling to a steam turbine. By using optimized burners, during operation with natural gas, mean nitrogen oxide emissions ($NO_x$=total nitrogen oxide, i.e. NO and $NO_2$ taken together) of less than 25 ppm (by volume) and carbon monoxide emissions (CO) of below 10 ppm can be guaranteed, wherein a defined test cycle is used as a basis for determination of the emissions. The national limiting values for power plant emissions may thereby be met in many industrial nations such as, e.g. Germany, still without any further exhaust gas aftertreatment.

Gas turbines are distinguished not only by low emissions and high efficiency, but also by capabilities such as operation under very differing loads (load flexibility from 100% down to values of below 30%) and rapid load changes up to rapid start (achieving the base load in less than 30 minutes). Because of the increasing fraction of energy from renewable sources (wind, solar, etc.) which are characterized by high fluctuations over time of the power fed into the electric supply grid, increasingly use is being made of the load flexibility of gas turbines. However, as a result, pollutant emissions occur which differ substantially from the average values determined in the test cycle: in the case of low burner outputs, the gas turbine burners are to be operated under equivalent conditions (i.e. fuel/air ratios based on the values required for stoichiometric combustion), which are far below the values required for the base load of the turbine.

Since these equivalent conditions are also far below the lean-burn limit for completely premixed combustion, increased emissions of uncombusted hydrocarbons and/or hydrocarbon mixtures (UHCs), of carbon monoxide (CO), and frequently also of nitrogen oxides, occur, and here there is a characteristic feature that the nitrogen oxides are emitted to an overwhelming proportion as nitrogen dioxide ($NO_2$). The latter, from the viewpoint of discharge into the lower atmosphere, is actually not a problem, because nitrogen monoxide is also oxidized in the course of just a few minutes in the atmosphere to form nitrogen dioxide. However, $NO_2$ has the unpleasant property of absorbing light in the blue and near-ultraviolet spectral range, in such a manner that even the operation of gas turbines, the pollutant emissions of which meet all legal provisions, owing to a yellow discoloration of the exhaust gas plume existing from the stack of the power plant in daylight, termed "yellow plume"), can lead to problems of acceptance.

In addition, in the case of gas turbines, there is frequently the possibility of using oil as an alternative fuel. In this case, compared with operation with natural gas, elevated nitrogen oxide emissions frequently occur, and the formation of $NO_2$ in noticeable concentrations is observed over a broad range of loads.

Gas turbine power plants are long-term investments which to date—just as with coal power plants—have usually been operated at base load, in order to achieve the highest possible yields from the generation of electrical energy. The nitrogen oxide emissions in this case are composed of virtually 100% nitrogen monoxide (NO). Yellowish exhaust gas plumes have therefore not been observed except in the case of sporadically occurring start-ups of the gas turbine. Therefore, to date there have also been no problems with visible emissions which have only been initiated by the rapidly growing fraction of renewable energies in the energy market.

Likewise, nitrogen dioxide emissions and thereby yellowish discolorations can be formed in exhaust gases of further systems which, under certain operating conditions, burn hydrocarbons or hydrocarbon mixtures incompletely, such as, for example, gas-operated compressors, gas- or oil-operated boilers, gas engines or ships operated with diesel or heavy oil. The occurrence of these $NO_2$ emissions in general and the dependence of this phenomenon on the fuel is due to the chemical gas-phase reactions between nitrogen monoxide (NO) and UHCs or CO in certain temperatures ranges which follow an incomplete combustion, as presented in MORIO HORI, NAOKI MATSUNAGA, NICK MARINOV, WILLIAM PITZ and CHARLES WESTBROOK: AN EXPERIMENTAL AND KINETIC CALCULATION OF THE PROMOTION EFFECT OF HYDROCARBONS ON THE NO—NO2 CONVERSION IN A FLOW REACTOR; Twenty-Seventh Symposium (International) on Combustion/The Combustion Institute; 1998; pages 389-396. Not only during the start-up phase of, for example, gas turbines, but also during the operation in low partial load, however, the incomplete combustion of the fuel used is accepted, in order to be able to ensure stable operating behavior of the gas turbine.

However, the formation of $NO_2$ can also have other causes which, in some circumstances, require different measures for reduction of $NO_2$ emissions: thus, in the case of gas turbines having a waste-heat steam generator and integrated multi-stage exhaust gas aftertreatment consisting of upstream CO oxidation catalyst followed by ammonia ($NH_3$) injection and downstream SCR catalyst (SCR, "selective catalytic reduction"), the formation of noticeable $NO_2$ emissions was observed. To solve this problem, in EP 2 223 733 A1, the placing of the CO oxidation catalyst in a suitable temperature zone was proposed. Such an exhaust gas purification, however, is complex and costly in method terms, such that it is also not retrofittable at will, or is only retrofittable with considerable expense, in existing systems.

SUMMARY

An aspect relates to providing a method and a device for reducing the concentration of nitrogen dioxide in an exhaust gas from an incomplete combustion of hydrocarbons or hydrocarbon mixtures, which method and which device can remove nitrogen dioxide in a simple and effective manner from the exhaust gas.

Another aspect relates to providing a retrofittable solution for reducing the $NO_2$ emissions in an exhaust gas from an incomplete combustion of hydrocarbons or hydrocarbon mixtures for systems which do not already have a system for selective catalytic reduction (SCR) of nitrogen oxides by means of $NH_3$ as reducing agent, and in this case advantageously to dispense with the storage, metering and injection of any reducing agent such as, e.g., ammonia. Advantages result in this case, in comparison with a solution requiring reducing agent injection, from reduced capital costs, reduced operating costs for reducing agent and maintenance, and the avoidance of the emission of unreacted or incompletely reacted reducing agents, which themselves can be pollutants.

The solution proposed here for reducing $NO_2$ emissions in gas turbine exhaust gases is based on the surprising finding that, by a catalytic reaction of the $NO_2$ with uncombusted hydrocarbons, with a catalytic activity selected to be sufficiently low for the oxidation of hydrocarbons with oxygen, an exhaust gas composition can be induced at which, even in the case of unchanged nitrogen oxide ($NO_x$) total concentration, the $NO_2$ concentration can be brought to a value which is far below that which is given by the thermodynamic equilibrium ratio between $NO_2$ and NO for the respective catalyst temperature.

BRIEF DESCRIPTION

Some of the embodiments will be described in detail, with reference to the following figures, wherein like designations denote like members, wherein.

DETAILED DESCRIPTION

Figure 1:
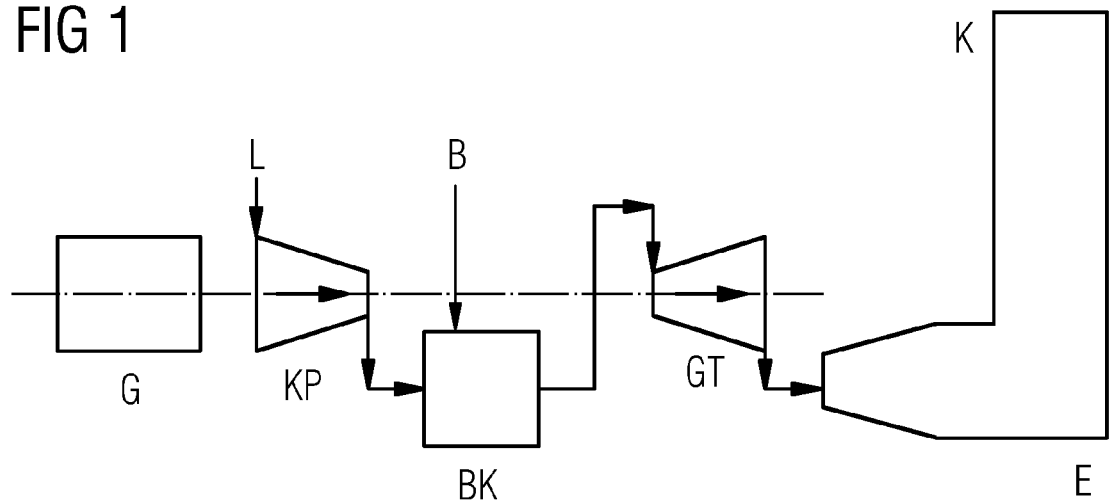
FIG. 1 shows a conventional turbine power plant without exhaust gas treatment.

The method according to embodiments of the invention for reducing the concentration of nitrogen dioxide in an exhaust gas from an incomplete combustion of hydrocarbons or hydrocarbon mixtures, wherein an exhaust gas containing nitrogen dioxide, $NO_2$, and uncombusted hydrocarbons, UHCs, is passed over a catalyst 1 for $NO_2$ reduction which reduces $NO_2$ by reaction with UHCs and in the process oxidizes UHCs, is distinguished in that the nitrogen dioxide present in the exhaust gas is reduced in the presence of the catalyst 1 by oxidation of UHCs at least to nitrogen monoxide, NO, in which the catalyst 1

(i) has a storage temperature $T_{UHCabs}$, above which it stores UHCs and also partial oxidation products of UHCs, (ii) has an activation temperature $T_{red}$, above which it catalyzes the reduction of $NO_2$ to at least NO by oxidation of the UHCs, and (iii) has a working temperature $T_{ox}$, at which oxidation of UHCs with oxygen, $O_2$, in the exhaust gas starts, in which the storage temperature $T_{UHCabs}$ for the storage of UHCs is below the activation temperature $T_{red}$ for the reduction of $NO_2$, as shown in equation (I):

$$T_{UHCabs} < T_{red}, \qquad (I)$$

and the working temperature $T_{ox}$ for the oxidation of the UHCs with $O_2$ is above $T_{red}$, as shown in equation (II):

$$T_{ox} > T_{red}. \qquad (II)$$

The device according to embodiments of the invention for reducing the concentration of nitrogen dioxide, in an exhaust gas from the incomplete combustion of hydrocarbons or hydrocarbon mixtures, is distinguished in that the device has a catalyst 1 for $NO_2$ reduction, which catalyst (i) has a storage temperature $T_{UHCabs}$, above which it stores uncombusted hydrocarbons, UHCs, and also partial oxidation products of UHCs, (ii) has an activation temperature $T_{red}$, above which it catalyzes the reduction of $NO_2$ to at least nitrogen monoxide NO by oxidation of the UHCs, and (iii) has a working temperature $T_{ox}$, at which oxidation of UHCs with oxygen, $O_2$, in the exhaust gas starts, in which the storage temperature $T_{UHCabs}$ for the storage of UHCs is below the activation temperature $T_{red}$ for the reduction of $NO_2$, as shown in equation (I):

$$T_{UHCabs} < T_{red}, \qquad (I)$$

and the working temperature $T_{ox}$ for the oxidation of the UHCs with $O_2$ is above $T_{red}$, as shown in equation (II):

$$T_{ox} > T_{red}. \qquad (II)$$

As a result of the working temperature $T_{ox}$ of the catalyst in the method according to embodiments of the invention and the device according to embodiments of the invention being such that it is above the activation temperature $T_{red}$, it can be ensured that, at least some of the time, a reduction of the concentration of $NO_2$ by available UHCs is ensured. In certain applications and embodiments, the concentration of nitrogen dioxide can be reduced to a value less than 100 ppm, preferably 50 ppm, and in particular 20 ppm, for example for diesel units, or 10 ppm, preferably 8 ppm, and in particular 6 ppm, for example for gas turbines.

In particular embodiments, the method according to embodiments of the invention can be operated at a temperature below $T_{ox}$, in order that a reduction of $NO_2$ concentration that is as complete as possible can be ensured. However, it is also possible that in such embodiments, the operating temperature can briefly exceed the working temperature $T_{ox}$, for example for a period of less than one hour, preferably less than 30 minutes, further preferably less than 20 minutes and particularly preferably less than 10 minutes. The more rapidly the temperature in such embodiments can be brought back below the temperature $T_{ox}$, the more rapidly an improved reduction of the $NO_2$ concentration can then be achieved. In addition, it can be possible that in such embodiments, the operating temperature can exceed the working temperature $T_{ox}$ for a relatively long period, if, for example, the combustion generating the exhaust gas proceeds completely and therefore $NO_2$ is not formed at all, or is only formed in concentrations so low that a reduction is not necessary.

Likewise, in certain embodiments, it can be preferred to carry out the method according to embodiments of the invention at a temperature greater than or equal to the activation temperature $T_{red}$, in order that nitrogen dioxide can be reduced as well as possible. However, it is also possible to carry out the method according to embodiments of the invention for a short time, for example for a period of less than 30 minutes, preferably less than 20 minutes, more preferably less than 10 minutes, and particularly preferably less than 5 minutes, at a temperature below $T_{red}$, but it can be preferred to bring the temperature rapidly back to a temperature greater than or equal to $T_{red}$.

In certain embodiments, it can be possible to operate the method according to embodiments of the invention principally, for example more than 95% of the time period, in a temperature range between $T_{red}$ and $T_{ox}$. In certain embodiments, it can be possible to operate the method according to embodiments of the invention at a time average at a temperature in a temperature range between $T_{red}$ and $T_{ox}$.

However, in certain embodiments, it can also be possible to carry out the method according to embodiments of the invention over a longer time period at a temperature below $T_{red}$, for example when a store for storing $NO_2$ is present which stores $NO_2$ at a temperature below $T_{red}$, provided that the temperature is increased to a value above or equal to $T_{red}$, when the storage capacity of the store for storing $NO_2$ is exhausted. A store for storing $NO_2$ can in this case be the catalyst 1 or a further catalyst, for example a catalyst 3 for storing $NO_2$, or a different store for storing $NO_2$, for example an absorption liquid.

In the method according to embodiments of the invention, the concentration of $NO_2$ at the catalyst can be reduced either completely or else only in part. Also, the $NO_2$ can be further reduced to nitrogen $N_2$, in which, however, it is reduced at least to nitrogen monoxide NO, in order to prevent the occurrence of yellow plume due to $NO_2$ emission. In certain embodiments, the reduction of $NO_2$ by UHCs to NO can be preferred, since in this case a lower energy of activation is required in comparison with the complete reduction to $N_2$. However, in certain embodiments, a complete reduction of the $NO_2$ to $N_2$ can be preferred from the environmental aspect, in order to avoid the back-formation of $NO_2$ from NO in the atmosphere after release of the purified exhaust gas, provided that the necessary conditions for the catalyst 1 according to embodiments of the invention are ensured. Likewise, in certain embodiments, it can be possible that the total amount of $NO_R$, which comprises NO and $NO_2$, can be reduced.

In addition, the oxidation of the UHCs in the method according to embodiments of the invention can be either a partial, or else a complete, oxidation of the UHCs. In certain embodiments, the oxidation can be a complete oxidation, since subsequent oxidation of the partial oxidation products of the UHCs, such as, for example, aldehydes and carbon monoxide, CO, which can be harmful to the atmosphere and/or the environment, can be avoided thereby. In certain embodiments, therefore, preferably complete oxidation of UHCs to carbon dioxide, $CO_2$, can take place.

As UHCs in the method according to embodiments of the invention, both un-combusted hydrocarbons alone, and mixtures of uncombusted hydrocarbons from the incomplete combustion of hydrocarbons or hydrocarbon mixtures, come into consideration. In the method according to embodiments of the invention, the hydrocarbons and hydrocarbon mixtures in the combustion are not particularly restricted, as is also the case for the uncombusted hydrocarbons and hydrocarbon mixtures.

For example, hydrocarbons and hydrocarbon mixtures which are combusted can comprise petroleum, natural gas, diesel, heavy oil, crude oil, methane, ethane, or else partially substituted hydrocarbons such as methanol or ethanol. The hydrocarbons in this case can comprise any number of carbons, for example 1 to 40 carbon atoms, and can be branched or unbranched, saturated or unsaturated, substituted or unsubstituted or aromatic or cyclic. In this case, it is not excluded that the hydrocarbon mixtures for combustion can also comprise other substances, such as, for example, carbon, sulfur, metals or other impurities, such as also substituted hydrocarbons such as, for example, thiols, alcohols, aldehydes, ketones, amines, nitro compounds, etc. Such further substances can, in certain embodiments, be found in the exhaust gas, but can also in certain embodiments be filtered upstream of the catalyst 1 and/or the catalysts 1 and/or 2 and/or 3. In certain embodiments, it is preferred to remove substances which adversely affect the catalyst 1 and/or the catalysts 1 and/or 2 and/or 3, for example as catalyst poison, upstream of the catalyst 1 and/or the catalysts 1 and/or 2 and/or 3.

The hydrocarbons and hydrocarbon mixtures provided for combustion can, in the context of embodiments of the invention, also be called fuels, provided that nothing else results from the context.

Uncombusted hydrocarbons can be, for example, hydrocarbons having 1 to 20, preferably 1 to 10, further preferably 1 to 4, carbon atoms, for example methane, ethane, propane, propene, butane, 1-butene, 2-butene, pentane, pentene, cyclopentane, hexane, benzene or toluene. Likewise, the uncombusted hydrocarbons and uncombusted hydrocarbon mixtures can be partially oxidized reaction products from the combustion of hydrocarbons and hydrocarbon mixtures which are still capable of a further oxidation, for example aldehydes and ketones. The hydrocarbons in this case can be saturated or unsaturated and branched or unbranched, or else cyclic or aromatic. Also, the hydrocarbons, in certain embodiments, can be substituted. In certain preferred embodiments, hydrocarbons are preferably fed to the catalyst 1 and/or the catalysts 1 and/or 2 and/or 3 which do not adversely affect this and/or these.

High $NO_2$ emissions in an exhaust gas, in the method according to embodiments of the invention, in particular in the operation of gas turbines or systems with natural gas or oil in the region of low partial load (<50%) and also at the start or other changes in load, can be reduced preferably by the combination of at least two measures in such a manner that visible discoloration of the exhaust gas plume no longer occurs and at the same time all legal limiting values are met. Changes in load or low partial loads can also occur, for example, in other systems according to embodiments of the invention, for example in systems which feed electrical power into the energy grid, or in systems, the load of which need not be continuously the same, or ships, which throttle their speed. Low loads can occur, for example, in power plants based on the combustion of hydrocarbons or hydrocarbon mixtures if a high amount of energy from fluctuating renewable energies, for example wind power and/or solar power, are placed into the energy grid, and therefore less energy from such power plants is required.

In certain embodiments, an exhaust gas, for example a gas-turbine exhaust gas, can be passed over a catalyst 1 having the following properties: above an activation temperature $T_{red}$, it reacts $NO_2$ with uncombusted hydrocarbon emissions UHCs of the gas turbine and reduces it at least to NO, in which process the UHCs are oxidized. Above a working temperature $T_{ox} > T_{red}$, the oxidation of UHCs with unconsumed oxygen $O_2$ in the exhaust gas begins.

In preferred embodiments, the rate of reaction for the oxidation with $O_2$ can be below that with $NO_2$, provided that the $NO_2$ concentration is above the desired emission limiting value. For example, the emission limiting value for the method according to embodiments of the invention can be 100 ppm, preferably 50 ppm, more preferably 20 ppm, particularly preferably 10 ppm and in particular 8 ppm, more particularly 6 ppm. In this manner, an improved reduction in the $NO_2$ concentration can be achieved.

In addition, the catalyst 1 in the method according to embodiments of the invention can have the property, above a low temperature $T_{UHCabs} < T_{red}$ of storing UHCs and the reaction products of the partial oxidation of UHCs, such as, e.g., aldehydes, and liberating them at a temperature $T_{UHCdes}$ preferably above, in particular not until markedly above, the working temperature for the oxidation $T_{ox}$, as shown in equation (III).

$$T_{UHCdes} > T_{ox} \quad (III)$$

For example, in preferred embodiments, the catalyst 1 can release the UHCs and the reaction products of the partial oxidation of UHCs at a temperature which is 20° C., preferably 50° C., and further preferably 100° C., above $T_{ex}$. In such an embodiment, it can, in particular, be ensured that even at low temperatures, a stock of UHCs is present in the catalyst 1 for $NO_2$ reduction, even if in operation of a system in the method according to embodiments of the invention, a deficit of UHCs is present, in comparison with $NO_2$. Also, in such embodiments, owing to the storage of UHCs at low temperatures, more UHCs can be available, if the temperature increases to $T_{red}$, and so then the reduced amount of $NO_2$ can be increased.

In preferred embodiments, the catalyst 1 can in addition have the property, above a likewise low temperature $T_{NO2abs}$, which is below $T_{red}$, as shown in equation (IV) of also storing $NO_2$ and only liberating/desorbing it at a temperature $T_{NO2des}$ above the activation temperature for the reduction, as shown in equation (V).

$$T_{NO2abs} < T_{red} \quad (IV)$$

$$T_{red} < T_{NO2des} \quad (V)$$

In such exemplary embodiments, a further reduction in the $NO_2$ concentration is possible at low temperatures such as, for example, during the start of the combustion of hydrocarbons, for example in a system according to embodiments of the invention at ambient temperatures in the range from −40° C. to +40° C., optionally in the range from 10 to 35° C., optionally in the range from 20 to 30° C. In such embodiments, it can be preferred that the temperature $T_{NO2des}$ is lower than $T_{ox}$, in order to ensure that during the desorption/release of $NO_2$, sufficient UHCs are present for $NO_2$ reduction. In preferred embodiments, $T_{NO2abs}$ is lower than the temperature at which the exhaust gas is passed through the catalyst 1.

In certain embodiments, for example at the start of the combustion, control of the method via the temperature also may not be possible, and so it can be preferred in such embodiments to generate more UHCs at the start, which can then be stored, in order that they are then available for $NO_2$ reduction when the temperature is elevated. After achieving a suitable $NO_2$ reduction, the amount of generated UHCs can then be decreased again.

In addition, the combustion in the method according to embodiments of the invention can be controlled in certain embodiments in such a manner that the time average UHC concentration, for example during the start phase and phases of low partial load, is above the time average of the $NO_2$ emission by a certain factor γ, which factor can be calculated according to equation (VI) from the concentrations of UHCs $X_{UHC}$ and $NO_2$ $X_{NO2}$.

$$\gamma = X_{UHC}/X_{NO2} > 1 \quad (VI)$$

The value of this factor can depend in this case, for example, on the fuel used in the combustion of hydrocarbons or hydrocarbon mixtures, for example natural gas or oil, on the catalyst material in respect of, for example, the composition, crystal structure and/or specific surface area thereof, and/or on the catalyst temperature. Also, the factor γ, in certain embodiments, can result, for example, via the amount/ratios of the materials added to the combustion such as air and hydrocarbons or hydrocarbon mixtures, and/or via the feed temperature of, for example, air and/or via control of the temperature in the combustion, for example in a combustion chamber BK. In certain embodiments, however, it is also possible that the factor γ briefly, for example in the range from 1 minute to 30 minutes, preferably in the range from 5 minutes to 10 minutes, adopts a value less than 1, if it then is reset to a value greater than 1.

In certain embodiments, the exhaust gas, downstream of the catalyst 1, can be passed over a catalyst 2 for the oxidation of UHCs, which catalyst 2 can oxidize UHCs and/or oxidation products of UHCs, for example by oxygen. In this manner, the release of UHCs or oxidation products of UHCs, which can also be environmentally harmful, can be lowered or reduced. In preferred embodiments, the catalyst 2 can catalyze the oxidation of the UHCs and/or oxidation products of UHCs at a temperature which the exhaust gas has after the passage through catalyst 1. In certain embodiments, the catalyst 2 can carry out the oxidation of the UHCs and/or oxidation products of UHCs at a temperature which is below or equal to $T_{red}$. In certain embodiments, the catalyst 2 can advantageously in addition also oxidize carbon monoxide CO, at least in part, to carbon dioxide $CO_2$. Suitable catalyst materials for such a catalyst 2 can be suitably used by a person skilled in the art.

Likewise, in certain embodiments, it can be possible to pass the exhaust gas upstream of the catalyst 1 over a catalyst 3 for $NO_2$ storage, which catalyst 3, in preferred embodiments, stores nitrogen dioxide at the temperature $T_{NO2abs}$ and releases it at the temperature $T_{NO2des}$. In these embodiments, an additional $NO_2$ storage is possible, as a result of which the concentration of $NO_2$ in the exhaust gas can be further reduced. Via the release of $NO_2$ at a temperature $T_{NO2des}$ above $T_{red}$, it can be possible in certain embodiments to reduce the $NO_2$ concentration further, since in such embodiments, the $NO_2$ is only passed to the catalyst 1 at a temperature above $T_{red}$. In preferred embodiments, $T_{NO2des}$ is below $T_{ox}$, in order to ensure that the $NO_2$ is passed to the catalyst 1 at a temperature below $T_{ox}$. In certain embodiments, the exhaust gas can be passed upstream of the catalyst 1 also via one or more further $NO_2$ storage media in addition to, or instead of, catalyst 3, for example an $NO_2$ sorption medium, or a solid storage medium, wherein the additional storage media can also in certain embodiments have the temperature properties of catalyst 3 with respect to $T_{NO2abs}$ and $T_{NO2des}$. In preferred embodiments, $T_{NO2abs}$ is lower than the temperature at which the exhaust gas is passed through the catalyst 3 and/or an additional storage medium. In certain embodiments, the catalyst 3 and a further $NO_2$ storage medium can also be provided. Suitable catalyst materials for the catalyst 3 can suitably be determined by those skilled in the art on the basis of simple experiments, for example in measuring systems. Also, furthermore, further storage catalysts and/or other catalysts for exhaust gas purification can be provided in certain embodiments.

In certain embodiments, it can be preferred to provide measures for setting the catalyst temperature to a temperature below $T_{max}$, for example of the catalyst 1 and/or of the catalyst 2 and/or of the catalyst 3: for example, catalysts having a good storage capacity for UHCs and/or $NO_2$ can react with a loss of storage capacity and/or catalytic activity at temperatures above a threshold $T_{max}$ which can be below the maximum exhaust gas temperatures, for example of gas turbines. In such preferred embodiments, it can therefore be possible to prevent damage to one or more catalysts which otherwise could lead to a lowering of the reduction of the $NO_2$ concentration.

In certain embodiments it can be possible to exploit the storage capacities of the catalyst 1 and/or of the catalysts 1 and/or 3 and/or further storage catalysts and/or storage media for a certain time period when the temperature falls below a certain temperature. In certain embodiments, however, it is preferred to control the method within the defined conditions of the method via corresponding control of the temperature and/or of the pressure and/or of the materials streams and/or of the concentrations of the substances in the exhaust gas, in such a manner that the stores can be constructed so as to be smaller.

In certain embodiments, therefore, for example in gas-turbine power plants, measures can be accepted/used for heat recovery/heat exchangers such as, e.g., steam generators, upstream of the catalysts, for example catalytic reactors, in order to ensure that the exhaust gas temperature in the catalyst is below $T_{max}$. If no measures for heat recovery can be provided, or they are not provided, in certain embodiments it can be preferred to use less sensitive catalysts which can be operated up to the maximum exhaust gas temperature downstream of the combustion of the hydrocarbons or hydrocarbon mixtures, preferably without loss of activity, in which, therefore, $T_{max}$ is higher than the maximum exhaust gas temperature.

In certain embodiments, it is also possible to take measures to increase or decrease the temperature upstream of one or more catalysts to a defined value, for example to a value between $T_{red}$ and $T_{ox}$ in the case of the catalyst 1 and/or to a value between $T_{NO2abs}$ and $T_{NO2des}$ in the case of the catalyst 3.

The measures for temperature elevation can proceed in certain embodiments via one or more heat exchangers/heat interchangers. The type of the heat exchanger in this case is in no way restricted. For example, it is possible, in a device according to embodiments of the invention comprising a catalyst 1 and/or a catalyst 2 and/or a catalyst 3, to provide respectively one or more heat exchangers upstream and/or downstream of the catalyst (1) and/or optionally upstream and/or downstream of the catalyst (2) and/or optionally upstream and/or downstream of the catalyst (3). Thus 0 to 30, preferably 4 to 20, and particularly preferably 10 to 15 heat exchangers can be provided, for example.

In certain embodiments, the temperatures upstream and/or downstream of the catalysts can also be adjusted additionally or solely suitably by adjusting the pressure upstream and/or downstream of the catalysts.

In certain embodiments, at least one heat exchanger is present respectively upstream of each catalyst and downstream of the last catalyst over which the exhaust gas is passed.

In certain embodiments, the temperature preconditions and/or reaction rate preconditions in the method according to embodiments of the invention and/or the device according to embodiments of the invention can be adjusted by suitable material selection of the catalyst/catalysts. In certain embodiments, the requirements of temperatures and/or reaction rates can be ensured by differing material selection of the catalysts.

The storage of UHCs and optionally $NO_2$ in the catalyst 1 and/or optionally of $NO_2$ in the catalyst 3 for $NO_2$ storage can proceed according to certain embodiments not only by absorption but also by adsorption on the catalyst, which in each case can be due to chemical and/or physical processes. The composition and crystal structure of the catalysts 1 and/or 3 used for the storage can preferably be adjusted in such a manner that storage and regeneration proceed reversibly by nonreactive or reactive release of the stored substances in the method according to embodiments of the invention. In particular, the materials properties can be adjusted in such a manner that the catalyst 1 or else other storage catalysts, for example the catalyst 3 for $NO_2$ storage, in the method according to embodiments of the invention are not damaged by the storage and regeneration by nonreactive or reactive release of the stored substances.

In the context of embodiments of the invention, a reference to the catalyst 1 and/or the catalyst 2 and/or the catalyst 3 can also be described by the reference to catalysts 1 and/or 2, provided that nothing else results from the presentation.

In certain embodiments, it can be possible that one or more catalysts 1 and/or one or more catalysts 2 and/or one or more catalysts 3 and/or one or more heat exchangers are provided in the method according to embodiments of the invention and/or the device according to embodiments of the invention. The catalysts and/or heat exchangers can here be identical or different.

In certain embodiments, it is additionally possible that the catalysts 1 and/or 2 and/or 3 are combined on a support, by, for example, a catalyst 1 being impregnated on one side and/or on opposite sides with a solution and/or an emulsion and/or a suspension of the catalyst material 2 and/or 3 and then thermally treated in such a manner that the entire catalyst 1 is not covered by the catalyst material of the catalyst 2 and/or the catalyst 3. For example, in this manner, various zeolites can be applied to cordierite supports. In such embodiments, a catalyst can then have differing zones each of which corresponds to a catalyst 1 and/or a catalyst 2 and/or a catalyst 3.

The catalyst materials for the catalysts 1 and/or 2 and/or 3 in the method according to embodiments of the invention and/or of the device according to embodiments of the invention are not particularly restricted, provided that they meet the required temperature conditions. Suitable catalyst and storage materials, characterized, for example, by composition, crystal form and/or surface properties, can be determined by those skilled in the art on the basis of known experimental methods such as temperature-programmed reaction, temperature-programmed absorption and temperature-programmed desorption, stress tests and long-term studies. Such studies may be carried out, for example, in measuring systems to which gas mixtures having a controllably adjustable composition, controllably adjustable gas volumetric stream and controllably adjustable temperature can be passed through a material-sample-containing reactor with controllably adjustable temperature, and can be quantitatively analyzed for the change in composition using suitable gas analysis technology.

For example, the $NO_2$ storage properties and/or the UHC storage properties of a catalyst can be influenced via the acidity and/or pore structure thereof. Also, the storage properties can be adjusted via the structure of crystal pores, such as, for example, in the case of zeolites.

For example, titanium dioxide $TiO_2$ exhibits good UHC storage which, in addition, may be stabilized, for example by tungsten trioxide $WO_3$, in such a manner that it is usable in the full exhaust gas temperature range of the gas turbine. At the same time, such a material also exhibits a storage capacity for $NO_2$. Via a higher content of $WO_3$, in addition, catalyst materials can be obtained for applications at relatively high temperatures, for example up to above 650° C. Further mixed oxides of titanium dioxide with, for example, zirconium dioxide or aluminum trioxide, such as $TiO_2/ZrO_2$ or $TiO_2/Al_2O_3$ are known to those skilled in the art as a basis for the catalyst production and of course can be likewise used.

If such a base material is admixed, for example, with vanadium pentoxide $V_2O_5$, reduction of $NO_2$ by UHCs and oxidation of UHCs can occur. The activation and working temperatures $T_{red}$ and $T_{ox}$ of these reactions fall generally with increasing $V_2O_5$ content of the catalyst. If the $V_2O_5$ content is selected to be too high, then the UHC oxidation predominates over the $NO_2$ reduction, and so in a broad temperature range, although a good reduction of the UHC emissions can be achieved, sufficient reduction of the $NO_2$ emissions can no longer be achieved. For example, in certain embodiments, at a $V_2O_5$ content of 1.7% by weight, even at relatively high temperatures, good $NO_2$ reduction can be ensured, whereas, at a $V_2O_5$ content of 3% by weight, at temperatures above 400° C., in certain embodiments a decrease in the $NO_2$ reduction can already occur.

Furthermore, zeolites such as those of the ZSM5 type exhibit excellent adsorption capacities for UHCs and with an appropriate doping with catalytically active components such as, e.g. Cu, Fe, Pt, W, In, or Ag (e.g. by impregnation with corresponding salts) also exhibit a good conversion rate of $NO_2$ to NO and sometimes even complete reduction of the nitrogen oxides to $N_2$. H-ZSM5 is particularly advantageous as base component of the $NO_2$ reduction catalyst, whereas the more widely distributed Na-ZSM5 is less advantageous for this application. Also, the zeolites are generally suitable for use at relatively high temperature, for example above 650° C.

Also, diverse catalyst materials can oxidize UHCs to form diverse products. Thus, for example, the Pt-$NH_4$ZSM5 catalyst used in example 1 can oxidize UHCs to $CO_2$, whereas the Fe-NaZSM5 catalyst used in example 1 or else the catalyst used in example 2 oxidizes UHCs to carbon monoxide.

In certain embodiments, the control of the method according to the invention and/or of a device according to the invention and/or of a system according to the invention can be in the range from 1 minute to 30 minutes, preferably in the range from 3 minutes to 10 minutes. In certain embodiments, however, a more rapid control can also take place.

A device according to the invention for reducing the concentration of nitrogen dioxide, in an exhaust gas from the incomplete combustion of hydrocarbons or hydrocarbon mixtures has at least one catalyst 1 for $NO_2$ reduction, which catalyst (i) has a storage temperature $T_{UHCabs}$, above which it stores UHCs and also partial oxidation products of UHCs,
(ii) has an activation temperature $T_{red}$, above which it catalyzes the reduction of $NO_2$ to at least NO by oxidation of the UHCs, and
(iii) has a working temperature $T_{ox}$, at which oxidation of UHCs with oxygen, $O_2$, in the exhaust gas starts, in which the storage temperature $T_{UHCabs}$ for the storage of UHCs is below the activation temperature $T_{red}$ for the reduction of $NO_2$, as shown in equation (I):

$$T_{UHCabs} < T_{red}, \quad (I)$$

and
the working temperature $T_{ox}$ for the oxidation of the UHCs with $O_2$ is above $T_{red}$, as shown in equation (II):

$$T_{ox} > T_{red}. \quad (II)$$

Furthermore, a device according to the invention, in certain embodiments, can have one or more catalysts 1 and/or one or more catalysts 2 and/or one or more catalysts 3 and/or one or more heat exchangers.

For example, a device according to the invention can, in certain embodiments, be a catalytic reactor for exhaust gas purification which is integrated into an exhaust gas line of a gas turbine, and which contains at least one catalyst 1.

In certain embodiments, the catalyst 1 and/or the catalyst 2 and/or the catalyst 3 can be constructed as honeycomb catalyst, plate catalyst, etc., in which, for example, cell density or plate separation and length of the catalyst are selected in such a manner that the exhaust gas residence time under the relevant operating conditions in certain embodiments exceeds 30 ms and the catalytic conversion of $NO_2$ with UHCs in the catalyst 1 is neither transport-limited nor is limited significantly by the conversion frequency of the catalyst, but on the other hand the exhaust gas counterpressure under full load is below a value which can be tolerated for the efficiency of the gas turbine, typically 5 to 10 mbar.

The catalyst 1 or the catalysts 1 and/or 2 and/or 3, in certain embodiments, can be extruded solid catalysts having thin cell walls or ceramic or metal supports of low wall thickness coated with catalyst material.

The device according to the invention can be used in systems in certain embodiments. Systems comprising a device according to the invention are also disclosed.

Examples of such systems can be gas-turbine power plants, compressors operated by one or more gas turbines, gas- or oil-operated boilers, gas engines or ship engines operated by the combustion of diesel or heavy oil.

In such systems, in certain embodiments, one or more devices for heat recovery and/or for heat exchange can be provided in the exhaust gas line of the system.

Such devices for heat recovery and/or heat exchange, in certain embodiments, can contain at least one-piece heat exchangers which come into contact with the exhaust gas. For example, such a device for heat recovery can in certain embodiments be a waste-heat steam generator.

Systems according to the invention can in certain embodiments also be district heating power plants with power-heat coupling, wherein, in such embodiments, careful matching with the other catalysts and the process can be necessary.

An exemplary system in which a device according to the invention can be provided is a gas-turbine power plant, as is shown in FIG. 1, which comprises a generator G, a compressor KP for compressing air L and a combustion chamber BK for operating a gas turbine G with a fuel B, a hydrocarbon or a mixture of hydrocarbons. Exhaust gas from the gas turbine GT in such a system is passed into the stack K via a diffuser D.

Figure 2:
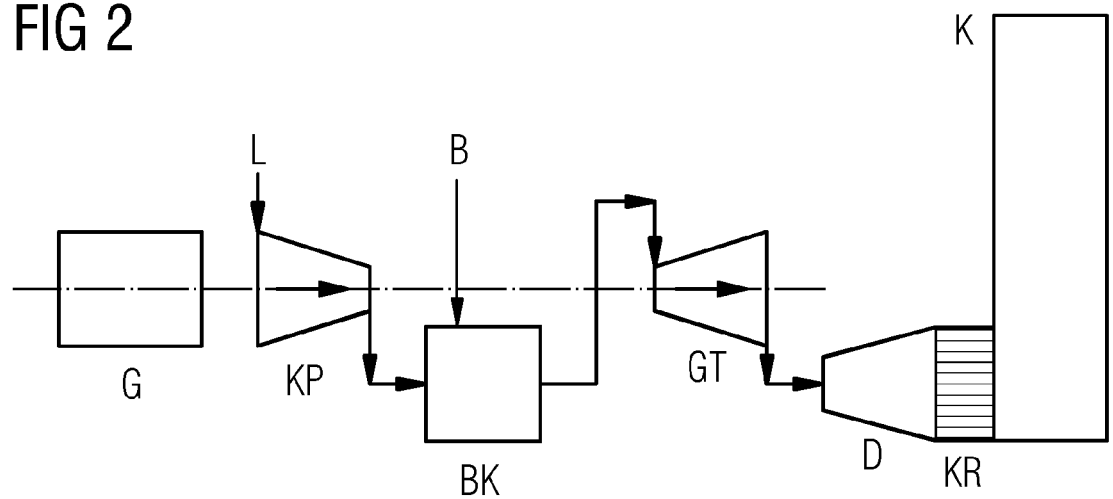
FIG. 2 shows a gas-turbine power plant with catalytic treatment for $NO_2$ reduction according to one embodiment of the present invention.

In certain embodiments of the invention, a device comprising a catalytic reactor KR can be introduced into such a system downstream of the diffuser D, as shown in FIG. 2.

In preferred embodiments, as shown in FIG. 2, for example, the device having the catalytic reactor KR is not mounted in the stack K, or is at least not mounted in the stack K in such a manner that the catalyst material can be exposed to rain, since rain can damage or destroy the catalyst or the catalysts, for example in consequence of a pressure explosion by evaporating rain. Damage can also occur in certain embodiments by strong temperature variations, since catalysts are sensitive to temperature shocks.

Figure 3:
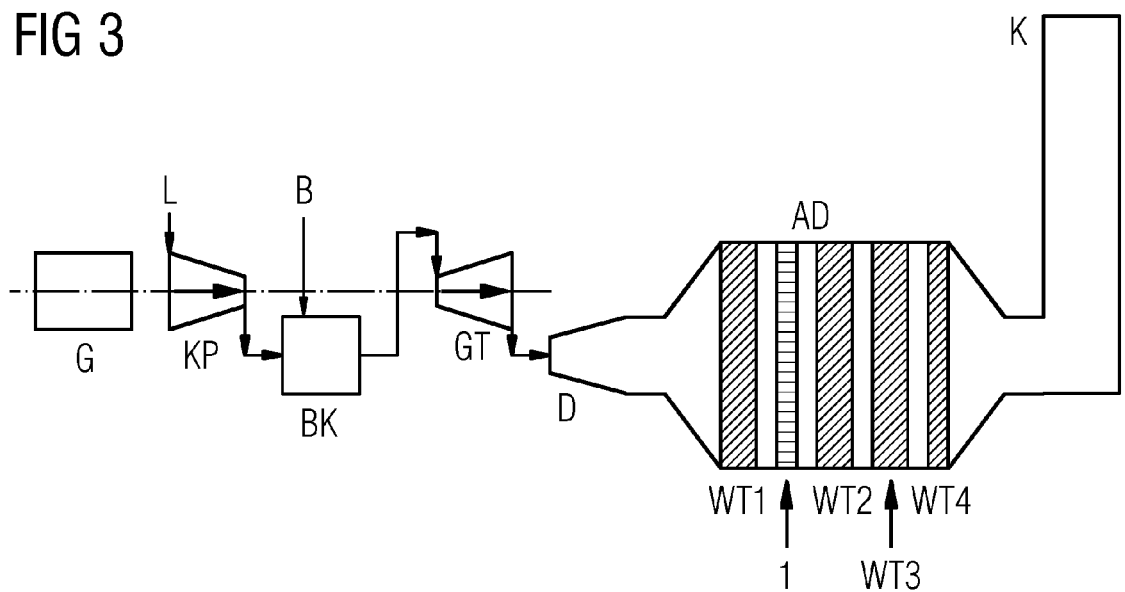
FIG. 3 shows a gas-turbine power plant with waste-heat steam generator and catalytic exhaust gas purification according to a further embodiment of the following invention.

A further embodiment according to the invention is shown in FIG. 3 in which, downstream of the diffuser, a waste-heat steam generator AD is provided, which has a catalyst 1 and four heat exchangers WT1, WT2, WT3 and WT4. In certain embodiments, however, a waste-heat steam generator can also comprise one or more catalysts, for example catalysts 1 and/or 2 and/or 3, and also one or more heat exchangers, in which case the heat exchangers can be arranged in different ways.

Figure 4:
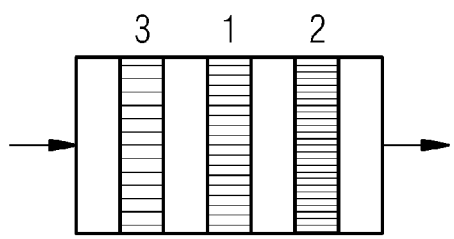
FIG. 4 shows a device according to an embodiment of the present invention.
Figure 5:
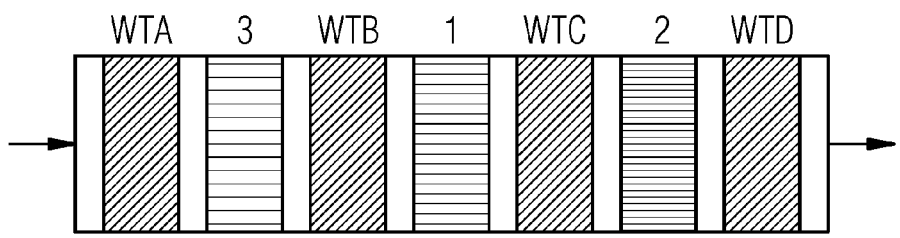
FIG. 5 shows a further device according to an embodiment of the present invention.

An exemplary embodiment of a device according to the invention is shown in FIG. 4, in which the exhaust gas flows from left to right successively through a catalyst 3, a catalyst 1 and a catalyst 2. In FIG. 5, a further exemplary embodiment of a device according to the invention is shown in which heat exchangers WTA, WTB, WTC and WTD are additionally provided upstream of, between and downstream of the catalysts 1, 2 and 3. However, in certain embodiments it is also possible to provide more catalysts, for example catalysts 1, 2 and 3, and/or more or fewer heat exchangers and/or to dispense with the catalyst 2 and/or the catalyst 3. The device shown in FIG. 5 can have advantages in certain embodiments, in particular during start-up/running-up, or during non-steady state operation of a system, since nitrogen dioxide can be stored. Also, the temperature in the catalysts can be controlled better via the heat exchangers.

Figure 6:
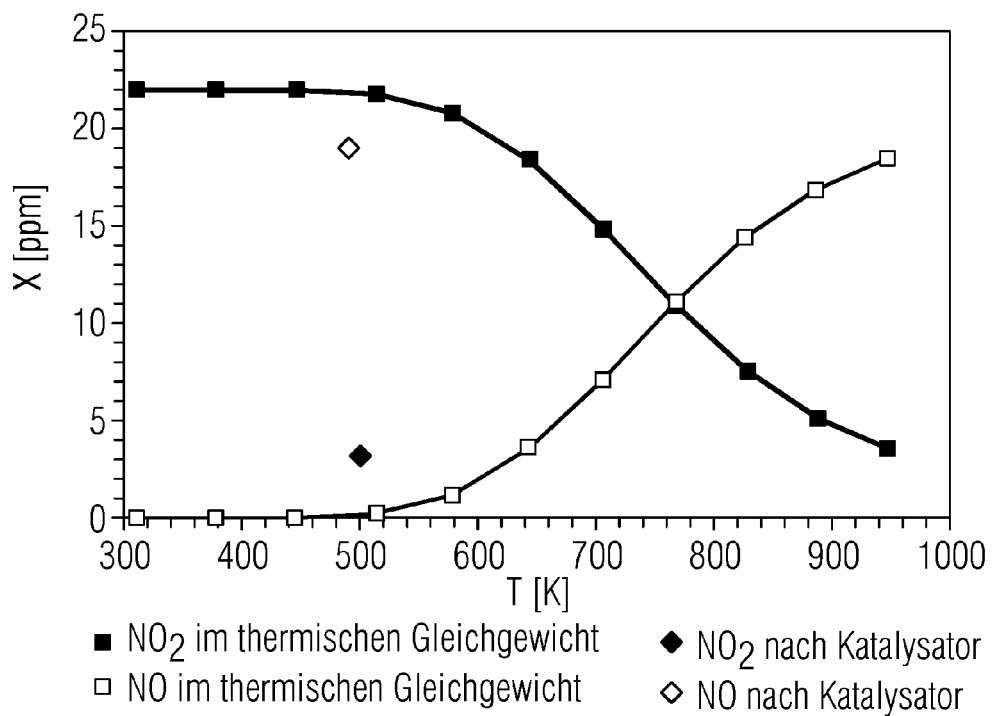
FIG. 6 shows the concentration course of NO and $NO_2$ in relative thermal equilibrium in the exhaust gas of a gas turbine and also the concentrations of NO and $NO_2$ downstream of an $NO_2$-reduction catalyst according to an embodiment of the present invention.

The effect of the use of a method according to the invention or a device according to the invention on the NO and $NO_2$ concentration downstream of a catalyst in certain embodiments according to the invention is shown by way of example in FIG. 6 in comparison with the equilibrium concentrations of the two substances in a gas turbine, wherein this Figure, however, does not limit the invention.

The above embodiments, configurations and developments may be combined as desired with one another, where this is meaningful. Further possible configurations, developments and implementations of the inventions also comprise combinations that are not cited explicitly of features of the invention described with respect to the exemplary embodiments hereinbefore or hereinafter. In particular, those skilled in the art will also add individual aspects as improvements or supplementations to the respective basic form of the present invention.

Exemplary Embodiments

The invention will now be described in more detail with reference to exemplary embodiments, wherein these exemplary embodiments in no way limit the invention.

Example 1

At a measuring system, a feed gas was passed as model exhaust gas having a composition of nitrogen $N_2/O_2/H_2O=82/8/10\%$ by volume having the impurities NO, $NO_2$ and a total hydrocarbon concentration $HC_{tot}$ according to tables 1 and 2 hereinafter over two different catalyst materials, Pt—$NH_4$ZSM5 and Fe—NaZSM5, which were coated with a cell density of 400 cells per square inch (cpsi) on a cordierite support. In this case, Pt—$NH_4$ZSM5 is a platinum-doped, ammonium-exchanged ZSM5 zeolite, and Fe-NaZSM5 is an iron-doped, sodium-ion-exchanged ZSM5 zeolite.

The space velocity in all experiments was 50,000/hour in relation to standard gas density. The total hydrocarbon concentration $HC_{tot}$ was measured by means of a flame-ionization detector and the concentration was reported as parts by volume in ppm C1 fraction.

The concentrations of NO and $NO_2$ were determined by means of electrochemical sensors.

The gas composition was measured at various temperatures, as listed in tables 1 and 2. Per catalyst, in each case two series of measurements were carried out, one with temperature increasing (ramp up) uniformly from 100° C. to 600° C., and one with temperature falling (ramp down) uniformly from 600° C. to 100° C., wherein the temperature change was +/−10 K/min. The series of measurements with increasing and falling temperatures in this case also serve for determining the storage capacity of the catalyst materials for non-combusted hydrocarbons UHCs. In the tables, in addition, the fraction of nitrogen dioxide which was removed after passage through the catalyst, with respect to the feed gas, is stated $deNO_2$ as in percent, and may be calculated as the difference between the $NO_2$ concentration in the feed gas and the respective $NO_2$ concentration downstream of the catalyst, which is divided by the $NO_2$ concentration in the feed gas.

TABLE 1

| | Feed gas | | | Pt—$NH_4$ZSM5 (incr.) | | | | Pt—$NH_4$ZSM5 (falling) | | | |
|---|---|---|---|---|---|---|---|---|---|---|---|
| T(° C.) | NO | $NO_2$ | $HC_{tot}$ | NO | $NO_2$ | $HC_{tot}$ | $deNO_2$ | NO | $NO_2$ | $HC_{tot}$ | $deNO_2$ |
| 100 | 98 | 172 | 1457 | 102 | 102 | 1238 | 41% | 126 | 98 | 1148 | 43% |
| 200 | 63 | 207 | 1310 | 111 | 23 | 882 | 89% | 140 | 28 | 246 | 86% |
| 300 | 61 | 209 | 915 | 152 | 49 | 98 | 77% | 163 | 65 | 113 | 69% |

TABLE 2

| | Feed gas | | | Fe—NaZSM5 (increasing) | | | | Fe—Na₄ZSM5 (falling) | | | |
|---|---|---|---|---|---|---|---|---|---|---|---|
| T(° C.) | NO | NO₂ | HC$_{tot}$ | NO | NO₂ | HC$_{tot}$ | deNO₂ | NO | NO₂ | HC$_{tot}$ | deNO₂ |
| 100 | 98 | 172 | 1457 | 24 | 145 | 1410 | 16% | 35 | 141 | 1430 | 18% |
| 200 | 63 | 207 | 1310 | 155 | 61 | 1610 | 71% | 133 | 52 | 1387 | 75% |
| 300 | 61 | 209 | 915 | 213 | 7.7 | 1102 | 96% | 199 | 3 | 590 | 99% |
| 400 | 97 | 173 | 64 | 160 | 0 | 128 | 100% | 174 | 0 | 108 | 100% |

As can be seen from tables 1 and 2, by use of the two catalysts Pt-NH₄ZSM5 and Fe-NaZSM5, the nitrogen dioxide concentration in the exhaust gas can be lowered after passage through the respective catalyst.

Comparison of the two tables shows that the Pt-NH₄ZSM5 catalyst reaches its temperature optimum for nitrogen dioxide as soon as approximately 200° C., whereas the Fe-NaZSM5 catalyst does not achieve its temperature optimum until 400° C. This could be due to the fact that the platinum-containing catalyst already catalyzes the oxidation of UHCs with oxygen at lower temperatures, and at higher temperatures, therefore, chiefly UHCs are removed from the mixture by oxidation with oxygen and can no longer be used to a great extent for reduction of NO₂. Also, a decrease in the total amount of NOx is observable in some cases.

In addition, it can be seen from tables 1 and 2 that in the case of the Pt-NH₄ZSM5 catalyst at 100° C., and also in the case of the Fe-NaZSM5 catalyst at all temperatures, more NO₂ can be removed with increasing temperature than with falling temperature, that is to say that less NO₂ remains after passage through the catalyst, which may be due to the particular storage action of the catalysts for UHCs with increasing temperature ($T_{UHCabs} < T_{red}$). In this case, the catalysts can store UHCs at a lower temperature, which UHCs are then available at the activation temperature $T_{red}$. In the case of falling temperature, however, no UHCs can be stored, since they can be first oxidized at the higher temperatures, or used by NO₂ reduction, in such a manner that fewer UHCs can remain at lower temperatures.

Example 2

An exhaust gas of a gas turbine which was being operated in partial load, was subjected in side stream to a catalytic NO₂ reduction with a catalyst based on TiO₂/WO₃N₂O₅, which contained 3% by weight V₂O₅. Ammonia, as is usual in the case of conventional SCR catalysts, was not added for the NO₂ reduction. In order to study the effect of the gas residence time on NO₂ reduction, the exhaust gas mass stream conducted in the side stream was varied systematically, which produced a change in the space velocity SV of the exhaust gas. The concentrations X [ppm] of NO and NO₂ in the exhaust gas upstream (NO(in) and NO₂(in)) and downstream (NO(out) and NO₂(out)) of the catalyst and the temperature T and the space velocity SV of the exhaust gas and also the concentration of UHCs in the exhaust gas X[ppmCl], on the basis of the Cl fraction, were in this case measured or calculated from measured values for mass flow, temperature, gas composition, and catalyst volume, and are shown in FIGS. 7a, 7b and 7c.

Figure 7A:
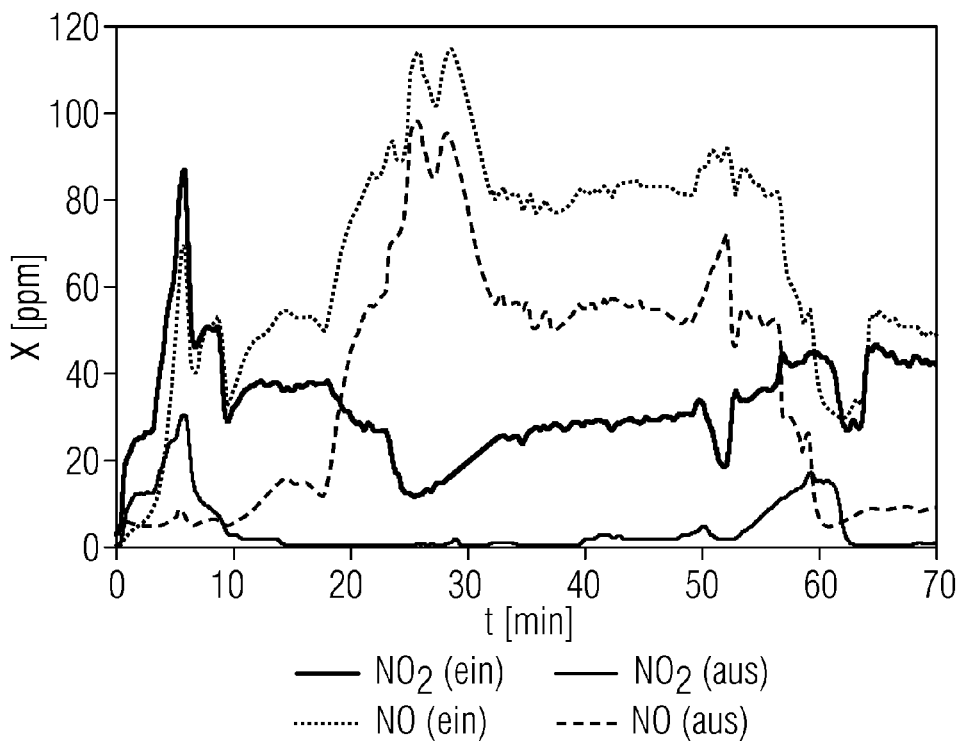
FIG. 7a shows the concentrations of NO and $NO_2$ of example 2.
Figure 7B:
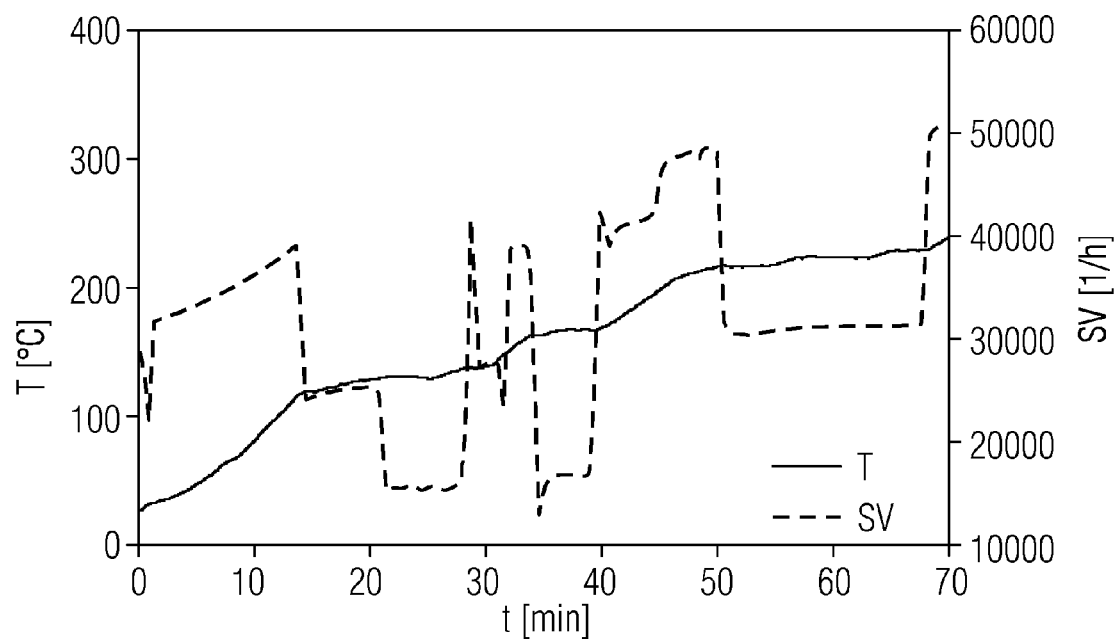
FIG. 7b shows the temperature course and the space velocity SV of example 2.
Figure 7C:
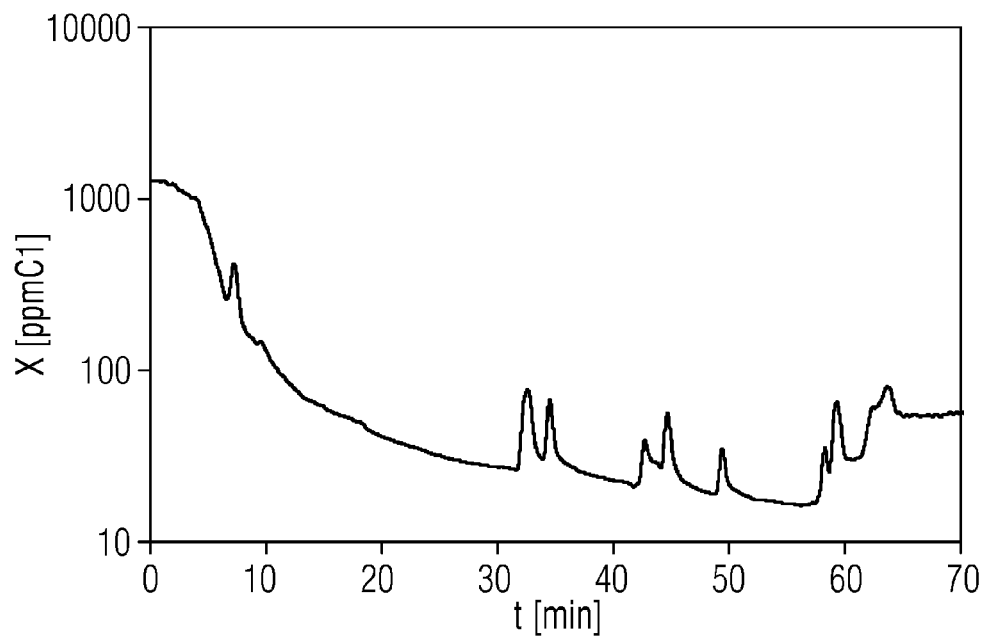
FIG. 7c shows and the concentration course of hydrocarbons of example 2, measured as Cl fraction.

It can be seen from FIG. 7a that the NO₂ concentration upstream of the catalyst during start-up of the gas turbine (within the first 10 minutes) reached a peak value of around 90 ppm and the NO₂ was partly reduced catalytically to NO: the NO₂ concentration downstream of the catalyst fell thereby to a peak value of around 30 ppm, while the NO concentration increased from around 10 ppm to 70 ppm. This corresponds to an NO₂ reduction of 67%. A further reduction in the NO₂ concentration could be achieved here, for example, by an additional NO₂ storage catalyst. In the further course of the experiment up to the 52$^{nd}$ minute, degrees of decrease of up to 100% were achieved, and the NO₂ concentrations downstream of the catalyst always remained below the limit of visibility. Thereafter the NO₂ concentration increased downstream of the catalyst to around 15 ppm, which is due to the fact that the UHC concentration in the exhaust gas was, from around 30 minutes, already on average below the NO₂ concentration upstream of the catalyst. An increase in UHC concentration in the gas-turbine exhaust gas from the 58$^{th}$ minute, then, with a slight time delay of only just 4 minutes, led again to an improved reduction in the NO₂ emissions to below 3 ppm. This clearly provides evidence of the effect of UHC storage, in combination with a suitable control of the gas-turbine combustion, on the reduction of the NO₂ concentration. As can be seen from the Figures, the NO₂ concentration downstream of the catalyst, compared with the concentration upstream of the catalyst, by suitable control of the gas turbine and of the system, and also, for example, by providing a sufficient amount of UHCs in the gas-turbine exhaust gas, can be markedly decreased, and therefore also clearly the occurrence of a yellow plume of the emitted exhaust gas can be avoided. Also, the Figures show the processes of storage and release of UHCs in the catalyst which lead to the change in the amount of NO₂ and NO in the exhaust gas downstream of the catalyst.

Conventional methods, as described, for example in EP 2 223 733 A1, proceed from NO₂ emissions which are formed in concentrations up to the temperature-dependent thermodynamic equilibrium ratio between NO and NO₂ by catalytic oxidation of NO. The solution proposed here for reducing NO₂ emissions, for example in gas-turbine exhaust gases, in contrast, is based on the surprising finding that in the case of a catalytic activity for the oxidation of hydrocarbons by oxygen which is selected to be sufficiently low, an exhaust gas composition can be induced at which the NO₂ concentration can be brought to a value which is far beneath that given by the thermodynamic equilibrium ratio between NO₂ and NO for the respective temperature, as may be seen from FIG. 6, for example, for a gas turbine: at temperatures below 300° C., it would be expected that the nitrogen oxides are predominantly present as NO₂.

The test results in FIG. 7, in contrast, provide evidence that, by catalytic treatment, NO₂ may be predominantly reduced to NO.

In contrast to conventional methods, the solution presented here does not require the stocking and injection of reducing agent (ammonia or urea) because it is not based on an NH₃—SCR method. In addition, in the most favorable case, for gas turbines, for example, only one catalytic section may be required in the exhaust gas line, which in addition can be significantly more compact than each of the sections in conventional methods, because the gas residence times required for $NO_2$ reduction are only 25-50% of the gas residence times required for SCR or CO oxidation.

Therefore, the solution provided here can in principle be retrofittable, whereas a complete SCR system, for reasons of construction space, in many cases cannot be retrofitted.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for reducing a concentration of nitrogen dioxide, $NO_2$, in an exhaust gas from an incomplete combustion of hydrocarbons or hydrocarbon mixtures, wherein an exhaust gas containing nitrogen dioxide and uncombusted hydrocarbons, UHCs, is passed over a catalyst for $NO_2$ reduction which reduces $NO_2$ by reaction with UHCs and in the process oxidizes UHCs, and the nitrogen dioxide present in the exhaust gas is reduced in the presence of the catalyst at least to nitrogen monoxide, NO, wherein the catalyst:
(i) has a storage temperature, $T_{UHCabs}$, above which the catalyst stores UHCs and also partial oxidation products of UHCs,
(ii) has an activation temperature, $T_{red}$, above which the catalyst catalyzes the reduction of $NO_2$ to at least NO by oxidation of the UHCs, and
(iii) has a working temperature, $T_{ox}$, at which oxidation of UHCs with oxygen, $O_2$, in the exhaust gas starts, wherein the storage temperature $T_{UHCabs}$ for the storage of UHCs is below the activation temperature $T_{red}$ for the reduction of $NO_2$, as shown in equation (I):

$$T_{UHCabs} < T_{red}, \quad (I)$$

and wherein the working temperature $T_{ox}$ for the oxidation of the UHCs with $O_2$ is above $T_{red}$, as shown in equation (II):

$$T_{ox} > T_{red}. \quad (II)$$

2. The method as claimed in claim 1, wherein a reaction rate for the oxidation of UHCs with oxygen is less than a reaction rate for the reduction of nitrogen dioxide with UHCs, provided that the concentration of the nitrogen dioxide after the reduction in the presence of the catalyst is above an emission limiting value.

3. The method as claimed in claim 1, wherein the catalyst additionally has a temperature, $T_{UHCdes}$, above which the catalyst liberates stored UHC and also partial oxidation products of UHCs, which temperature is above $T_{ox}$, as shown in equation (III):

$$T_{UHCdes} > T_{ox}. \quad (III)$$

4. The method as claimed in claim 1, wherein the catalyst has a temperature, $T_{NO2abs}$, above which the catalyst stores nitrogen dioxide and which is below $T_{red}$, as shown in equation (IV):

$$T_{NO2abs} < T_{red}, \quad (IV)$$

and has a temperature, $T_{NO2des}$, above which the catalyst releases nitrogen dioxide and which is above $T_{red}$, as shown in equation (V):

$$T_{red} < T_{NO2des}. \quad (V)$$

5. The method as claimed in claim 1, wherein a time average UHC concentration $X_{UHC}$ is above a time average of the nitrogen dioxide concentration $X_{NO2}$ by the factor $\gamma$, which is given by the equation (VI):

$$\gamma = X_{UHC}/X_{NO2} > 1. \quad (VI)$$

6. The method as claimed in claim 1, wherein heat is withdrawn from the exhaust gas before it is passed over the catalyst, in order that the exhaust gas, when passed over the catalyst, has a temperature which is lower than a maximum temperature, $T_{max}$, above which, in the case of the catalyst for $NO_2$ reduction, the storage capacity for UHCs and/or $NO_2$ decreases and/or above which the catalytic activity in nitrogen dioxide reduction is reduced.

7. The method as claimed in claim 1, wherein the exhaust gas, downstream of the catalyst, is passed over a catalyst for UHC oxidation which oxidizes UHCs and also partial oxidation products of UHCs.

8. The method as claimed in claim 1, wherein the exhaust gas, upstream of the catalyst, is passed over a catalyst for $NO_2$ storage, which catalyst stores nitrogen dioxide at the temperature $T_{NO2abs}$ and releases it at the temperature $T_{NO2des}$.

9. The method as claimed in claim 7, wherein heat is withdrawn from the exhaust gas upstream and/or downstream of the catalyst and/or optionally upstream and/or downstream of the catalyst.

10. A device for reducing the concentration of nitrogen dioxide, $NO_2$, in an exhaust gas from the incomplete combustion of hydrocarbons or hydrocarbon mixtures, in which the device has a catalyst for $NO_2$ reduction, the catalyst:
(i) has a storage temperature, $T_{UHCabs}$, above which the catalyst stores uncombusted hydrocarbons, UHCs, and also partial oxidation products of UHCs,
(ii) has an activation temperature, $T_{red}$, above which the catalyst catalyzes the reduction of $NO_2$ to at least nitrogen monoxide NO by oxidation of the UHCs, and
(iii) has a working temperature, $T_{ox}$, at which oxidation of UHCs with oxygen, $O_2$, in the exhaust gas starts, in which the storage temperature, $T_{UHCabs}$ for the storage of UHCs is below the activation temperature, $T_{red}$ for the reduction of $NO_2$, as shown in equation (I):

$$T_{UHCabs} < T_{red}, \quad (I)$$

and wherein the working temperature $T_{ox}$ for the oxidation of the UHCs with $O_2$ is above, $T_{red}$, as shown in equation (II):

$$T_{ox} > T_{red}. \quad (II)$$

11. The device as claimed in claim 10, wherein the catalyst additionally has a temperature, $T_{UHCdes}$ above which the catalyst liberates stored UHCs and also partial oxidation products of UHCs, which temperature is above $T_{ox}$, as shown in equation (III):

$$T_{UHCdes} > T_{ox}. \quad (III)$$

12. The device as claimed in claim 10, in which the catalyst has a temperature, $T_{NO2abs}$, above which the catalyst stores nitrogen dioxide and which is below $T_{red}$, as shown in equation (IV):

$$T_{NO2abs} < T_{red}, \quad (IV)$$

and has a temperature, $T_{NO2des}$, above which the catalyst releases nitrogen dioxide and which is above, $T_{red}$, as shown in equation (V):

$$T_{red} < T_{NO2des}. \quad (V)$$

13. The device as claimed in claim 10, further comprising an additional catalyst for the UHC oxidation, the additional catalyst being mounted in such a manner that it comes into contact with the exhaust gas downstream of the catalyst.

14. The device as claimed in claim 10, further comprising an additional catalyst for $NO_2$ storage, which is mounted in such a manner that the additional catalyst comes into contact with the exhaust gas upstream of the catalyst.

15. The device as claimed in claim 10, which has, in the direction of the gas stream through the catalyst, at least one heat exchanger upstream and/or downstream of the catalyst and/or optionally upstream and/or downstream of the catalyst and/or optionally upstream and/or downstream of the catalyst.

16. A system comprising a device as claimed in claim 10.

17. The system as claimed in claim 16, wherein the system is at least one of a gas turbine power plant, a compressor operated by a gas turbine, a gas- or oil-operated boiler, a gas engine, and a ship engine operated by the combustion of diesel or heavy oil.

* * * * *